United States Patent
Won et al.

(10) Patent No.: US 6,754,488 B1
(45) Date of Patent: Jun. 22, 2004

(54) SYSTEM AND METHOD FOR DETECTING AND LOCATING ACCESS POINTS IN A WIRELESS NETWORK

(75) Inventors: King L. Won, San Jose, CA (US); Kazim O. Yildiz, Wayne, NJ (US); Handong Wu, Los Angeles, CA (US)

(73) Assignee: Networks Associates Technologies, Inc., Santa Clara, CA (US)

( * ) Notice: Subject to any disclaimer, the term of this patent is extended or adjusted under 35 U.S.C. 154(b) by 181 days.

(21) Appl. No.: 10/090,319

(22) Filed: Mar. 1, 2002

(51) Int. Cl.[7] .......................... H04Q 7/20; H04B 17/00
(52) U.S. Cl. ................. 455/424; 455/67.13; 455/456.1; 455/456.4; 370/254; 709/224
(58) Field of Search .......................... 455/67.11, 67.13, 455/67.15, 422.1, 423, 424, 456.1, 456.2, 456.3, 456.4, 41.1, 41.2, 41.3; 370/241, 254, 328, 338; 709/224

(56) References Cited

U.S. PATENT DOCUMENTS

| | | | |
|---|---|---|---|
| 6,263,208 B1 | * | 7/2001 | Chang et al. ............. 455/456.3 |
| 6,397,154 B1 | * | 5/2002 | Jones et al. .................... 702/57 |
| 2002/0105912 A1 | * | 8/2002 | Krishnamachari et al. .. 370/241 |
| 2003/0054829 A1 | * | 3/2003 | Moisio ........................ 455/452 |
| 2003/0117985 A1 | * | 6/2003 | Fujii et al. ................... 370/338 |
| 2003/0131082 A1 | * | 7/2003 | Kachi ......................... 709/220 |
| 2003/0140137 A1 | * | 7/2003 | Joiner et al. ................. 709/224 |
| 2003/0157895 A1 | * | 8/2003 | Agrawal et al. ............ 455/67.1 |
| 2003/0185244 A1 | * | 10/2003 | Wu et al. ..................... 370/503 |

FOREIGN PATENT DOCUMENTS

WO          01/26335 A2     4/2001      ........... H04L/29/06

* cited by examiner

*Primary Examiner*—Nay Maung
*Assistant Examiner*—Edan Orgad
(74) *Attorney, Agent, or Firm*—Silicon Valley IP Group, PC; Kevin J. Zilka; Christopher J. Hamaty

(57) ABSTRACT

A system, method and computer program product are provided for ascertaining the location of an access point in a wireless network. Initially, a strength of a radio frequency signal of an access point of a wireless network is monitored at a position utilizing a wireless network analyzer. Next, the wireless network analyzer is moved about the position. The foregoing operations may be repeated to allow the location of the access point to be ascertained based on the monitored strength of the radio frequency signal.

18 Claims, 4 Drawing Sheets

SYSTEM AND METHOD FOR DETECTING AND LOCATING ACCESS POINTS IN A WIRELESS NETWORK

FIELD OF THE INVENTION

The present invention relates to network analyzers, and more particularly to analyzing wireless networks.

BACKGROUND OF THE INVENTION

Network assessment tools referred to as "analyzers" are often relied upon to analyze networks communications at a plurality of layers. One example of such analyzers is the Sniffer® device manufactured by Network Associates®, Inc. Analyzers have similar objectives such as determining why network performance is slow, understanding the specifics about excessive traffic, and/or gaining visibility into various parts of the network.

In use, network analyzers often take the form of a program that monitors and analyzes network traffic, detecting bottlenecks and problems. Using this information, a network manager can keep traffic flowing efficiently. A network analyzer can also be used legitimately or illegitimately to capture data being transmitted on a network. For example, a network router reads every packet of data passed to it, determining whether it is intended for a destination within the router's network or whether it should be passed further along the Internet. A router with a network analyzer, however, may be able to read the data in the packet as well as the source and destination addresses. It should be noted that network analyzers may also analyze data other than network traffic. For example, a database could be analyzed for certain kinds of duplication, etc.

Network analyzers have been used to monitor various types of networks including wireless networks. Wireless communications can be vulnerable to eavesdropping since radio frequency (RF) waves radiate everywhere within a transmitter range, including areas outside of physical buildings. This makes the task of securing a wireless local area network (LAN) difficult. It is also relatively simple to set up additional stations/access points (APs) to intercept/interfere with the normal operations of wireless networks. These rogue devices can compromise the security of these networks.

Various problems exist in physically locating rogue APs. These problems are complicated by the nature of RF waves used in wireless LANs. Table #1 itemizes these various problems.

TABLE #1

The logical address of a wireless node is not an indication of its physical location. They may be located anywhere within the wireless LAN service area.
There are no readily apparent boundaries for RF waves. They can propagate well outside of the building's physical area. Various physical means (i.e. metallic shielding in the building, etc.) commonly used to confine RF waves traditionally are not economically feasible for most wireless environments.
The RF wave propagation properties are time varying, asymmetric and highly susceptible to environmental conditions. The presence or absence of various objects or even people can affect propagation.
The rogue devices may or may not be observable from any one particular location due to the nature of the propagation, thus making their detection by stationary detectors problematic.

To date, network analyzers have only been able to identify whether APs exist and whether they are expected or not. Unfortunately, this functionality is limited in terms of locating rogue devices and resolving such situations. There is thus a need for a network analyzer that can not only detect and identify APs, but also overcome the foregoing problems in the realm of wireless networks in order to physically locate rogue devices so that appropriate security actions, authentication, etc. may be carried out.

DISCLOSURE OF THE INVENTION

A system, method and computer program product are provided for ascertaining the location of an access point in a wireless network. Initially, a strength of a radio frequency signal of an access point of a wireless network is monitored at a position utilizing a wireless network analyzer. Next, the wireless network analyzer is moved about the position. The foregoing operations may be repeated to allow the location of the access point to be ascertained based on the monitored strength of the radio frequency signal.

In one embodiment, the wireless network may include an 802.11 wireless network. Further, a list of access points may be defined for the wireless network. As an option, a list of access points with unique identifiers (i.e. MAC addresses) may be tagged as expected/authorized, and any other access points not on this list are considered suspect.

In another embodiment, the wireless network analyzer may be moved to another position. Moreover, the foregoing method of ascertaining the location of the access point may be repeated at the additional position to further refine the process.

In still another embodiment, an administrator or the like may react to the access point upon ascertaining the location thereof. Just by way of example, the access point may be sought out and eliminated, authenticated, etc. As an option, a global positioning system may be used in the course of ascertaining the location of the access point. As a further option, the wireless network analyzer may include a mobile handset.

In still yet another embodiment, the various operations of the present technique may be carried out for ascertaining the location of a plurality of access points. In such embodiment, each of the access points may be differentiated and tracked utilizing an identifier (i.e. MAC address).

As an option, a degree of accuracy may be defined by a user, administrator or in a predetermined manner. As such, a notification may be output upon the location of the access point being ascertained within the defined degree of accuracy. To this end, the present techniques may be repeated until the location of the access point is ascertained with a desired degree of accuracy.

Thus, a system and method of searching out and locating, both inside or outside a physical premises, unexpected or unauthorized access points (i.e. wireless local area network (LAN) stations, etc.) is provided by tracking the radio frequency (RF) signal strengths at various locations. This technique may also be useful in locating other RF devices.

DESCRIPTION OF THE PREFERRED EMBODIMENTS

Figure 1:
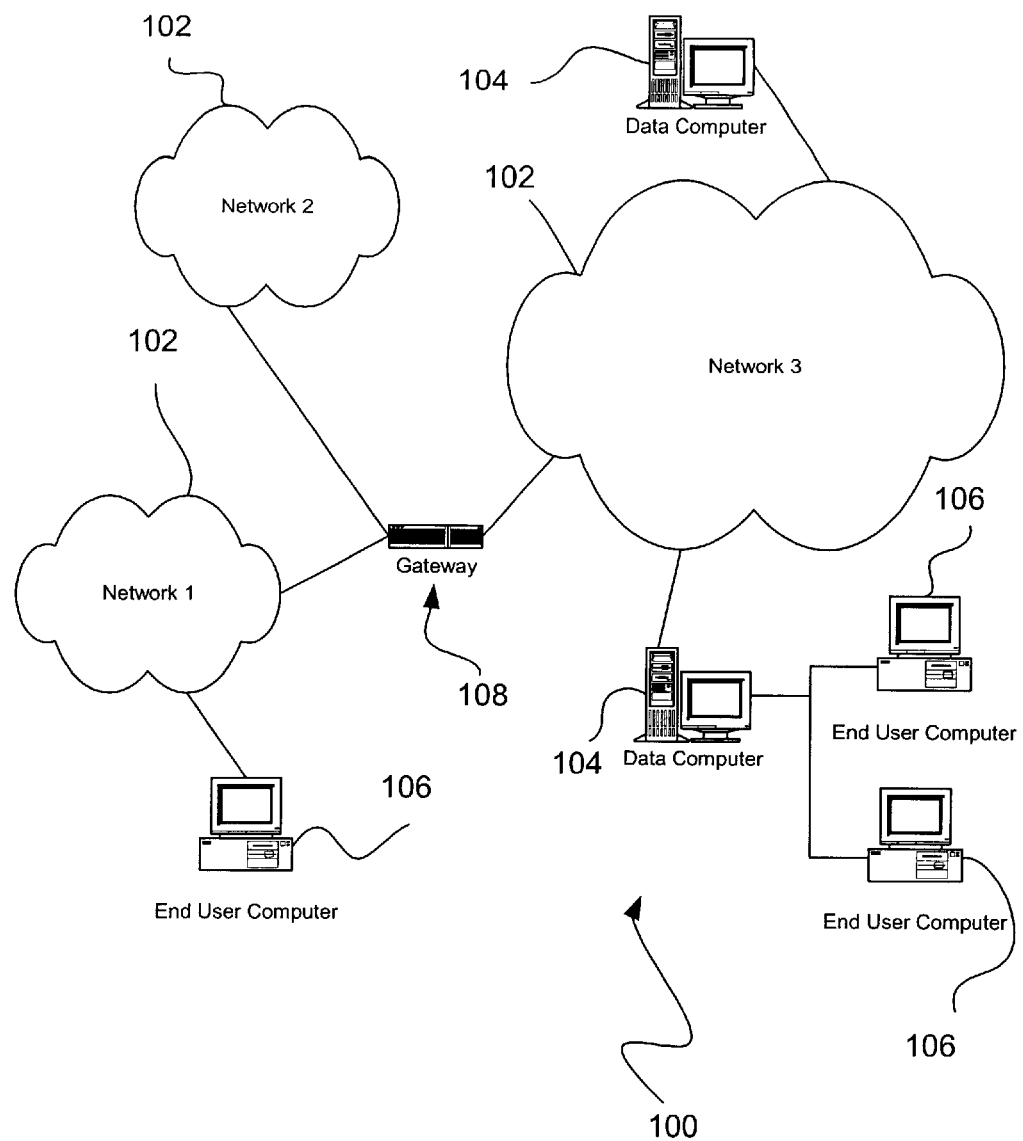
FIG. 1 illustrates an exemplary network environment, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data servers 104 which are capable of communicating over the networks 102. Also coupled to the networks 102 and the data servers 104 is a plurality of end user computers 106. In the context of the present description, such end user computers 106 may include a web server, desktop computer, lap-top computer, hand-held computer, printer or any other type of hardware/software.

In order to facilitate communication among the networks 102, at least one gateway 108 is coupled therebetween. It should be noted that each of the foregoing network devices as well as any other unillustrated devices may be interconnected by way of a plurality of network segments.

At least one of the networks 102 may be a wireless network. In one embodiment, the wireless network may include an 802.11 local area wireless network. In the context of the present description, a 802.11 local area wireless network may include an 802.11a, 802.11b, as well as other future 802.11 wireless network schemes. Of course, any one or more of the networks 102 may take the form of any type of wireless network that utilizes radio frequency (RF) signals to communicate.

Figure 2:
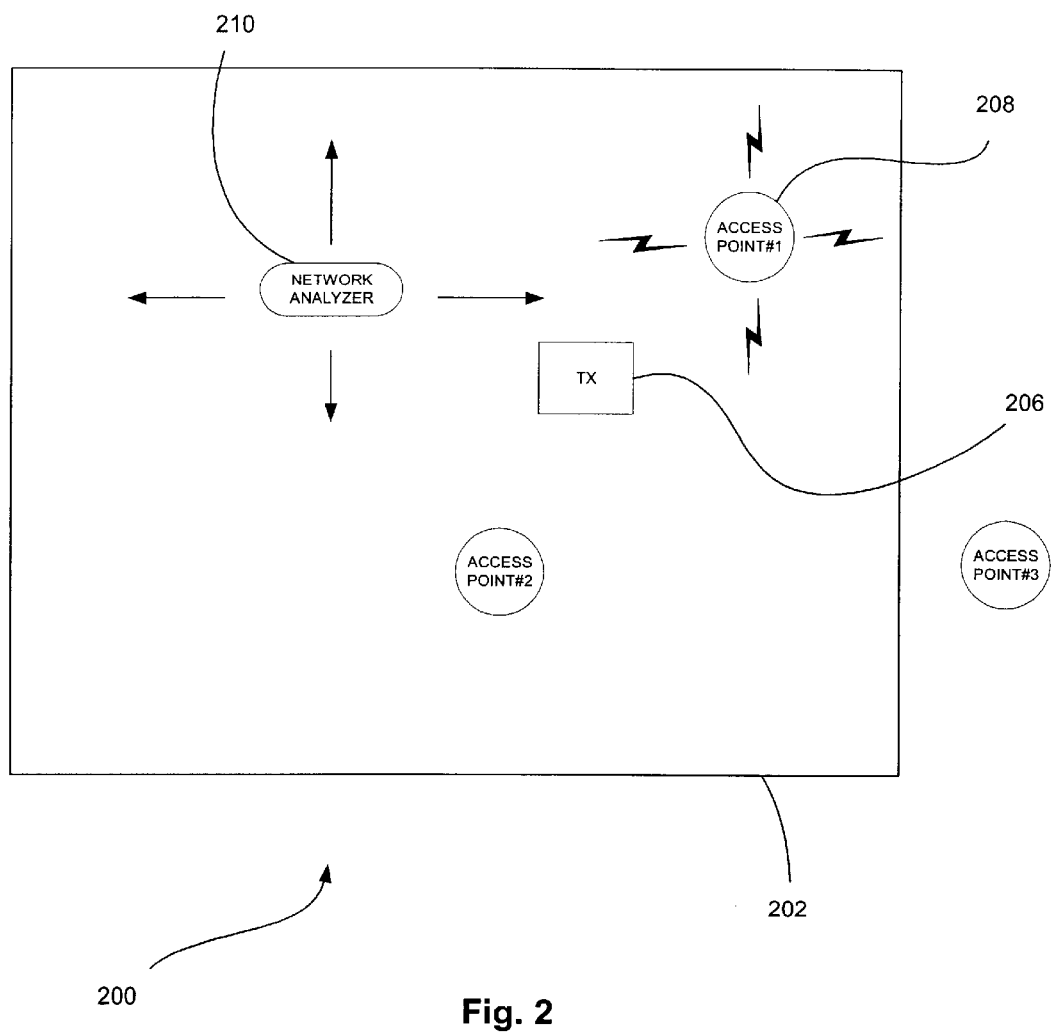
FIG. 2 illustrates one exemplary wireless network environment, in accordance with one embodiment.

FIG. 2 illustrates one exemplary wireless network 200, in accordance with one embodiment. As shown, a structure 202 (i.e. building, etc.) is provided in which the wireless network 200 is implemented. As an option, the structure 202 may be equipped with a metallic or any other type of material impermeable to RF signals for enhancing the security of the wireless network 200 by preventing communication therewith from a point outside the structure 202.

As shown in FIG. 2, the wireless network 200 includes at least one transceiver 206 that is capable of wireless communication with a plurality of access points 208 in order to provide access to the wireless network 200 and any networks coupled thereto.

In the context of the present description, the access points 208 may refer to any computer or device with wireless communication capabilities. In one embodiment, the access points 208 may include mobile lap-top or palm computers equipped with wireless modems. It should be noted that such access points 208 may include authorized access points 208 that are authorized to communicate with and access/manipulate data on the wireless network 200. Still yet, the access points 208 may also include unauthorized access points 208 that are not authorized to access the wireless network 200.

Next provided is at least one network analyzer 210. Such network analyzer 210 may be relied upon to analyze networks communications over the wireless network 200. Ideally, the wireless network analyzer may include a mobile handset. One example of such network analyzer 210 includes the Sniffer® device (i.e. 802.11 Sniffer®) manufactured by Network Associates®, Inc. Of course, any network analyzer 210 that can gauge RF signal strengths may be utilized.

In use, the network analyzer 210 may be utilized to ascertain the location of an access point 208 in the wireless network 200. Initially, a strength of an RF signal of an access point of a wireless network is monitored at a position utilizing the network analyzer 210. Next, the wireless network analyzer is moved about the position. The foregoing operations may then be repeated to allow the location of the access point to be ascertained based on the monitored strength of the RF signal.

Figure 3:
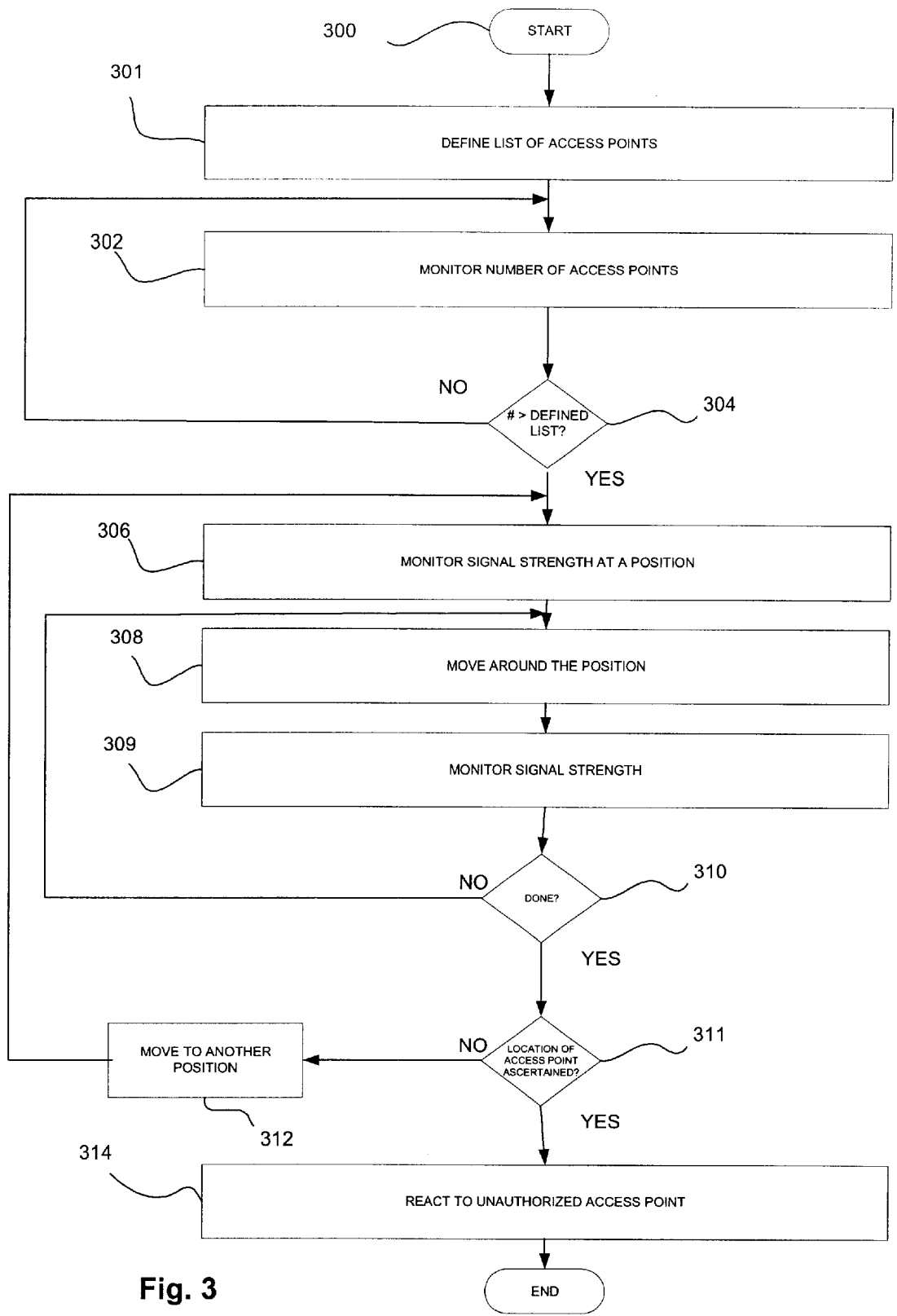
FIG. 3 illustrates a method of ascertaining the location of an access point in a wireless network, in accordance with one embodiment.

More information as to one way this may be accomplished will be set forth in greater detail during reference to FIG. 3. In addition to this functionality, the network analyzer 210 may further be capable of collecting any type of information for the purpose of determining why network performance is slow, understanding the specifics about excessive traffic, and/or gaining visibility into various parts of the wireless network 200.

FIG. 3 illustrates a method 300 of ascertaining the location of an access point in a wireless network, in accordance with one embodiment. The method 300 may be implemented in the context of the architecture of FIGS. 1 and 2. Of course, however, the method 300 may be implemented in any desired environment.

Initially, a list of access points is defined for the wireless network. See operation 301. This list may be established when the wireless network is set up. Further, the list may be updated upon any additional authorized access points being established. Table #1 illustrates a sample access point list.

TABLE #1

AccessPoint1
AccessPoint2
AccessPoint3
AccessPoint4
AccessPoint5
AccessPoint6
AccessPoint7

During the course of use of the wireless network, a plurality of access points on the wireless network may be continuously monitored utilizing a network analyzer. See operation 302. In one embodiment, this may be accomplished by the network analyzer monitoring wireless communications involving the access points. During such monitoring, conventional identifiers [i.e. Media Access Control (MAC) addresses] included with such communications may be compared against identifiers associated with a list such as that in Table #1.

If a mismatch occurs, it may be determined in decision 304 that at least one of the access points is unauthorized, and may constitute a security threat. At this point, the unique identifier associated with such unauthorized access point may be ascertained and stored for locating the access point, in a manner that will now be set forth.

Next, in operation 306, the network analyzer is positioned at an initial position. A strength of an RF signal associated with the access point of interest is then monitored. In particular, a sample of such RF signal strength may be logged in operation 306.

Next, in operation 308, the network analyzer is moved about the position. Once moved, the RF signal strength may again be monitored in operation 309. Preferably, the movement about the position is in a circular motion in order to obtain RF signal strength samples around the position in order to enhance the accuracy of associated triangulation calculations, in a manner that will soon be set forth.

At this point, operations 308 and 309 may be repeated as many times is deemed necessary. See decision 310. In one embodiment, a triangulation calculation may be carried out after each iteration of operations 308 and 309. It should be noted that such triangulation calculations render a vector directed toward the access point of interest. As such, the operations may be repeated until the vector generated by the triangulation calculation is of a sufficient accuracy. Such accuracy may be determined based on the variation of each vector with respect to that of a previous iteration, or simply based on a fixed predetermined number of recommended iterations, etc.

Upon it being determined that the vector is of sufficient accuracy per decision 310, it may be determined whether the location of the access point of interest has been ascertained in decision 311. This decision 311 may be decided by way of a manual or automatic process.

For example, at any point in the present method 300, a desired accuracy may be defined either manually or automatically. Thus, the decision 311 may be decided based on whether the location of the access point of interest has been located within the defined degree of accuracy. Similar to before, the degree of accuracy may be based on the variation of each vector with respect to that of previous iterations of operations 306–310, or by any other desired technique. As an option, a visual or audible notification may be provided to the user upon the degree of accuracy being met. To this end, the present techniques may be repeated until the location of the access point is ascertained with the desired degree of accuracy.

If it is determined in decision 311 that the location of the access point has not be ascertained sufficiently, the network analyzer may be moved to another position in operation 312. Next, the network analyzer may be moved about the additional position for again taking multiple samples of the RF signal strength, in accordance with operations 306–310. It should be noted that the iteration of operations 306–310 may be important since reflections of RF signals within a structure may render an inaccurate vector at one particular position or another.

Once the location of the access point of interest is sufficiently ascertained in decision 311, any desired security measure may be carried out to ensure that the security of the wireless network is not jeopardized by the unauthorized access point. Just by way of example, the access point may be sought out and eliminated, authenticated, etc.

As an option, the foregoing method 300 may be used to ascertain the location of a plurality of access points simultaneously with a single network analyzer. This may be accomplished by using the identifiers to distinguish and monitor the RF signal strength of each of the unauthorized access points.

As an option, a global positioning system (GPS) may be used in the course of ascertaining the location of the access point. Further, a map of a structure in which the wireless network is installed may be used in conjunction with the aforementioned vectors or GPS to identify an exact location of an access point therein.

Figure 4:
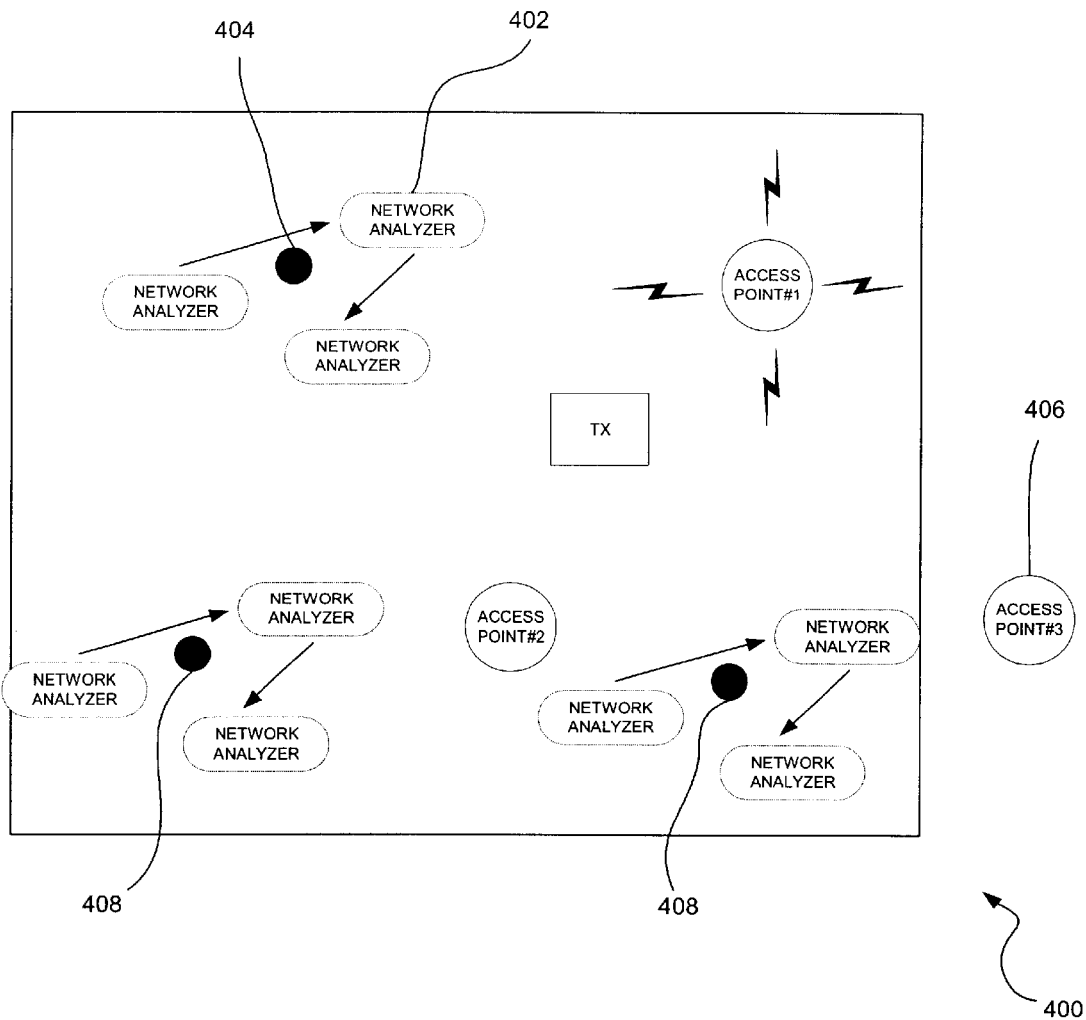
FIG. 4 illustrates an example of operation, in accordance with one embodiment.

FIG. 4 illustrates an example of operation 400, in accordance with one embodiment. It should be noted that the present method 400 is set forth for illustrative purposes only, and should not be construed as limiting in any manner.

As mentioned earlier, a network analyzer 402 may be provided that includes at least one mobile device that can roam from point to point. By this roaming ability, the network analyzer 402 may detect rogue access points that are out of range or simply undetectable due to temporary RF propagation situations. For instance, a network analyzer 402 located on a north side of an area may not be able to detect the presence of a rogue access point located on a south side of the area because the RF signal may not reach the network analyzer 402 due to the distance involved. However, the rogue access point may be communicating with transceivers that are within its RF range.

When the presence of a rogue access point has been detected, the network analyzer 402 may be moved about. Upon locating a first position 404 at which RF signals from an unauthorized access point 406 can be detected, such position 404 may be marked in any desired manner. Next, by walking in a circle about the first position 404, the network analyzer operator can use the RF signal strength indicator of the network analyzer 402 at different points on the circle to determine which is the likely direction from which the unauthorized access point 406 is broadcasting.

The next step is for the network analyzer operator to repeat the previous technique at various additional positions 408 within the area of interest and record the different vectors calculated using the RF signal strengths. Once a sufficient set of data points has been gathered, the various vectors from these readings may be plotted in order arrive at a possible set of locations for the unauthorized access point 406.

It should be noted that the foregoing operation may be automated via software algorithms to plot the locations of the unauthorized access point 406. This algorithm may be designed to keep track of multiple unauthorized access points 406 and make use of the various data values (point locations, direction, signal strength, rogue device ID, etc.) to pinpoint their possible locations.

The network analyzer operator may further specify to what degree of location details (within how many square meters, etc.) he/she may want the algorithm to provide. Thus, when the desired detail has been achieved, the network analyzer operator is notified, and the location(s) displayed along with the suspected unauthorized access points 406 and the identifiers associated therewith.

If the tests are being performed in an outdoor area, it may be possible to use GPS devices to provide the coordinates. By assigning a consistent scale for the RF signal strength, this data can be used to generate a topology map for locating the unauthorized access point 406.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for ascertaining the physical location of an access point in a wireless network, comprising:

(a) monitoring a strength of a radio frequency signal of an access point of a wireless network at a position utilizing a wireless network analyzer;

(b) moving the wireless network analyzer about the position;

(c) repeating (a); and (d) ascertaining the physical location of the access point based on the monitored strength of the radio frequency signal.

2. The method as recited in claim 1, wherein the wireless network includes an 802.11 wireless network.

3. The method as recited in claim 1, and further comprising defining a list of access points for the wireless network.

4. The method as recited in claim 3, and further comprising monitoring a plurality of access points on the wireless network.

5. The method as recited in claim 4, and further comprising initiating (a)–(d) upon identifying at least one access point not on the list.

6. The method as recited in claim 1, and further comprising moving the wireless network analyzer to another position.

7. The method as recited in claim 6, and further comprising repeating (a)–(d).

8. The method as recited in claim 1, and further comprising reacting to the access point upon ascertaining the physical location thereof.

9. The method as recited in claim 1, wherein the physical location is further ascertained utilizing a global positioning system.

10. The method as recited in claim 1, wherein the wireless network analyzer includes a mobile handset.

11. The method as recited in claim 1, wherein (a)–(d) are carried out for ascertaining the physical location of a plurality of access points.

12. The method as recited in claim 11, and further comprising identifying each of the access points utilizing an identifier.

13. The method as recited in claim 1, and further comprising defining a degree of accuracy.

14. The method as recited in claim 13, and further comprising outputting a notification upon the physical location of the access point being ascertained within the defined degree of accuracy.

15. A computer program product embodied on a computer readable medium for ascertaining the physical location of an access point in a wireless network, comprising:

(a) computer code for monitoring a strength of a radio frequency signal of an access point of a wireless network at a position utilizing a wireless network analyzer;

(b) computer code for executing (a) at multiple points about the position; and (c) computer code for ascertaining the physical location of the access point based on the monitored strength of the radio frequency signal.

16. A system for ascertaining the physical location of an access point in a wireless network, comprising:

(a) means for monitoring a strength of a radio frequency signal of an access point of a wireless network at a position, wherein the strength of the radio frequency signal is monitored at multiple points about the position; and (b) means for ascertaining the physical location of the access point based on the monitored strength of the radio frequency signal.

17. A system for ascertaining the physical location of an access point in a wireless network, comprising:

(a) a wireless network analyzer for monitoring a strength of a radio frequency signal of an access point of a wireless network at a position, the strength of the radio frequency signal being monitored at multiple points about the position;

(b) wherein the physical location of the access point is ascertained based on the monitored strength of the radio frequency signal utilizing the wireless network analyzer.

18. A method for ascertaining the physical location of an access point in a wireless network, comprising:

(a) defining a list of access points for a wireless network;

(b) defining a degree of accuracy;

(c) monitoring a plurality of access points on the wireless network;

(d) upon identifying at least one access point not on the list:

(i) monitoring a strength of a radio frequency signal of at least one access point of the wireless network at a position utilizing a wireless network analyzer, (ii) moving the wireless network analyzer about the position, and (iii) repeating (i);

(e) moving the wireless network analyzer to an additional position;

(f) repeating (i)–(iii) based on the additional position;

(g) ascertaining the physical location of the access point based on the monitored strength of the radio frequency signal; and (h) outputting a notification upon the physical location of the access point being ascertained within the defined degree of accuracy;

(i) wherein the physical location of a plurality of access points is ascertained.

* * * * *